(12) United States Patent
Bouchez et al.

(10) Patent No.: US 8,482,229 B2
(45) Date of Patent: Jul. 9, 2013

(54) CONTROLLING METHOD OF SWITCHES OF SWITCHING ARMS, NOTABLY FOR CHARGING ACCUMULATION MEANS, AND CORRESPONDING CHARGING DEVICE

(75) Inventors: Boris Bouchez, Cergy le Haut (FR); Luis De Sousa, Eragny sur Seine (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 197 days.

(21) Appl. No.: 13/165,080

(22) Filed: Jun. 21, 2011

(65) Prior Publication Data
US 2011/0316465 A1  Dec. 29, 2011

(51) Int. Cl.
*H02J 7/04* (2006.01)

(52) U.S. Cl.
USPC .......... 318/139; 318/107; 318/110; 318/599; 320/137; 320/166; 320/167; 320/123; 320/127; 320/143; 320/112; 320/109; 320/128; 320/107; 363/19; 363/21.18; 363/34; 363/37; 363/39

(58) Field of Classification Search
USPC ............... 318/139, 107, 110, 599; 320/107, 320/166, 167, 127, 128, 137, 163, 121; 363/19, 363/21.18, 34, 37, 39
See application file for complete search history.

(56) References Cited

U.S. PATENT DOCUMENTS

| | | | |
|---|---|---|---|
| 6,788,029 B1 * | 9/2004 | Gabrys | 322/4 |
| 6,885,567 B2 * | 4/2005 | Lincoln et al. | 363/56.01 |
| 7,180,758 B2 * | 2/2007 | Lincoln et al. | 363/56.01 |
| 7,397,676 B2 * | 7/2008 | Lincoln et al. | 363/56.01 |
| 7,531,916 B2 * | 5/2009 | Franklin et al. | 307/64 |
| 7,859,201 B2 * | 12/2010 | Oyobe et al. | 318/105 |
| 7,957,166 B2 * | 6/2011 | Schnetzka et al. | 363/56.03 |
| 8,180,585 B2 * | 5/2012 | Cech et al. | 702/65 |
| 2008/0074905 A1 * | 3/2008 | Moiseev et al. | 363/20 |

FOREIGN PATENT DOCUMENTS
WO  2010/057893 A1  5/2010

OTHER PUBLICATIONS

French Search Report issued in the corresponding French application No. 1055105, mailing date Apr. 14, 2011 (1 page).
Hobraiche J et al.: "Offline Optimized Pulse Pattern with a View to Reducing DC-Link Capacitor Application to a Starter Generator", Power Electronics Specialists Conference, 2004. PESC Apr. 2004 IEEE 35TH Annual, Aachen, Germany, Jun. 20, 2004 (pp. 3336-3341).

* cited by examiner

*Primary Examiner* — Rita Leykin
(74) *Attorney, Agent, or Firm* — Osha Liang LLP

(57) ABSTRACT

The present invention relates to a method for charging accumulation means via an external electrical network via at least a first (A) and a second (B) switching arm respectively comprising two switches (12), said method comprising a step for controlling the switches (12) of the switching arms (A, B) by transmission of pulse width modulation control signals, characterized in that the switches (12) of the second switching arm (B) are controlled by adapting the pulse width of the control signals so as to generate an alternating voltage (Vx) in phase opposition relative to the voltage at the terminals of a compensation inductance (7') connected on the one hand to the second arm (B) and on the other hand to the neutral (N) of said network, so that the voltage ($V_N$) between the neutral (N) of said network and ground is a direct voltage.
The invention also relates to a charging device for implementing such a charging method.

14 Claims, 4 Drawing Sheets

Figure 1A:
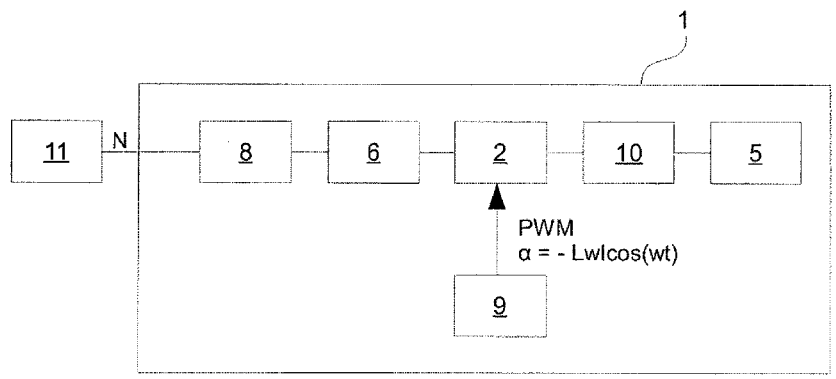

CONTROLLING METHOD OF SWITCHES OF SWITCHING ARMS, NOTABLY FOR CHARGING ACCUMULATION MEANS, AND CORRESPONDING CHARGING DEVICE

The present invention relates to a controlling method of switches of a system comprising said switches. Such a system may be used to implement charging method in the field of engines or alternators powered by rechargeable batteries. The invention is advantageously applicable in the field of electric motor vehicles in which the batteries can power the engine via an inverter and be recharged when the motor vehicle is stopped.

However, although particularly designed for such an application, the device and the associated method can be used in other fields and notably in energy generation devices of wind turbine or hydraulic type.

Conventionally, an electric vehicle is equipped with high-voltage batteries delivering a direct current to an inverter which transforms this direct current into an alternating current that can be used to power an electric engine, the latter ensuring the movement of the vehicle.

So as to ensure the recharging of these high-voltage batteries, it is known to equip the vehicle with a charging device incorporated in the electric vehicle comprising a power controlling converter with no diode bridge, also known by the name of "Bridgeless PFC".

Common-mode currents generated by the switching of the converter circulate in the spurious capacitances exhibited by the electronics relative to the chassis, or the engine relative to the chassis or even the battery relative to the chassis. These currents are looped back via the chassis, the earth wire linked to the neutral of the electrical network. The charger therefore emits disturbances on the electrical network. Standards limit the emission of low-frequency disturbances on the electrical network in order to prevent a person from being electrified or electrocuted because of the currents circulating in the chassis.

The aim of the invention is therefore to limit these low-frequency disturbances by preventing the stray capacitances from being excited by voltage variations.

To this end, exemplary embodiments of the invention provide a method for controlling switches of a system connected to an external electrical network, the system comprising at least a first and a second switching arm respectively comprising two switches, said method comprising a step for controlling the switches of the switching arms by transmission of pulse width modulation control signals, the switches of the second switching arm being controlled by adapting the pulse width of the control signals so as to generate an alternating voltage in phase opposition relative to the voltage at the terminals of a compensation inductance connected on the one hand to the second arm and on the other hand to the neutral of said network, so that the voltage between the neutral of said network and ground is a direct voltage.

The system may be made up of the switching arms.

When the voltage between the neutral of the network and ground is a direct voltage, there is therefore no longer a risk of the stray capacitances being excited by voltage variations and the low-frequency disturbances are thus limited.

Other exemplary embodiments of the invention provide a method for charging accumulation means via an external electrical network via at least a first and a second switching arm respectively comprising two switches, said method comprising at least the step for controlling the switches of the switching arms by transmission of pulse width modulation control signals of the above-mentioned controlling method.

According to said step, the switches of the second switching arm are controlled by adapting the pulse width of the control signals so as to generate an alternating voltage in phase opposition relative to the voltage at the terminals of a compensation inductance connected on the one hand to the second arm and on the other hand to the neutral of said network, so that the voltage between the neutral of said network and ground is a direct voltage.

Said controlling or charging method may also include one or more of the following characteristics, alone or in combination:
- the second switching arm is controlled in open loop mode and the pulse width is chosen to be substantially equal as an average value to the opposite of the alternating voltage of the compensation inductance,
- the second switching arm is controlled in closed loop mode by varying the pulse width so that the voltage between the neutral of said network and ground is slaved to a setpoint,
- said method comprises the following steps:
    - the voltage is measured between the neutral of said network and ground,
    - the measured voltage is compared to the setpoint,
    - if the measured voltage differs from the setpoint, the pulse width is modified so that the voltage between the neutral of said network and ground is substantially equal to the setpoint,
- the first arm is controlled so as to absorb a sinusoidal current.

In closed loop mode, the switches of the second switching arm may be controlled by control signals whose pulse width is adapted dynamically so that the voltage between the neutral of the network and ground is slaved to a setpoint that is notably the direct voltage generated by the second arm. The pulse width is not slaved to a setpoint.

In open loop mode, the pulse width may not be slaved to a setpoint.

Other exemplary embodiments of the invention provide a corresponding charging device for implementing the charging method as defined above. This device is an electrical device for charging accumulation means via an external electrical network, said accumulation means being configured to power an engine with alternating current, said electrical device comprising:
- an inverter connected between said engine and the accumulation means, the inverter having at least a first and a second switching arm respectively comprising two switches, said switching arms being linked by their midpoints to the phase of said engine, and
- a control circuit for controlling said switches by transmission of pulse width modulation control signals, characterized in that:
- said device also includes a compensation inductance linked to the second switching arm and to the neutral of said network, and in that
- the control circuit is configured to control the switches of the second arm by transmission of control signals whose pulse width is adapted so that the second arm generates an alternating voltage in phase opposition relative to the voltage at the terminals of the compensation inductance, so that the voltage between the neutral of said network and ground is a direct voltage.

Said device may also include one or more of the following characteristics, alone or in combination:
- said device is a single-phase device,
- said device is configured to control the second switching arm in open loop mode, said device is configured to control the second arm in closed loop mode by slaving the voltage of the neutral to a setpoint, and said device includes at least a processing means for:
- measuring the voltage between the neutral of said network and ground,
- comparing the measured voltage to the setpoint,
- if the measured voltage differs from the setpoint, correcting the value of the pulse width so that the voltage between the neutral of said network and ground is substantially equal to the setpoint, said device also includes a capacitor and a resistor mounted in series with the compensation inductance so as to form a low-pass filter, the inverter has two H-configuration bridge structures respectively produced by two switching arms, the control circuit is configured to control the switches so as to switch from a power supply mode for said engine to a charging mode for the accumulation means and vice versa.

In the above-mentioned methods or device, the first switching arm may comprise a mid-point linked to a first terminal of a phase of the engine, the second switching arm may comprise a mid-point linked to a first terminal of the compensation inductance, the second terminal of the compensation inductance being linked to the neutral of the network while the second terminal of the phase of the engine is linked to a phase of the network. Phase of the engine, network and compensation inductance may thus be mounted in series. The neutral of the network may be linked to ground.

The accumulation means may form a battery generating a direct voltage

Figure 1B:
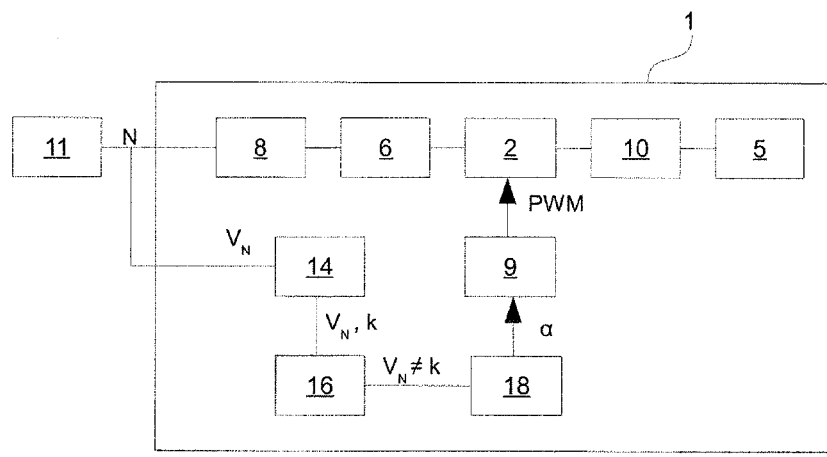
Figure 2:
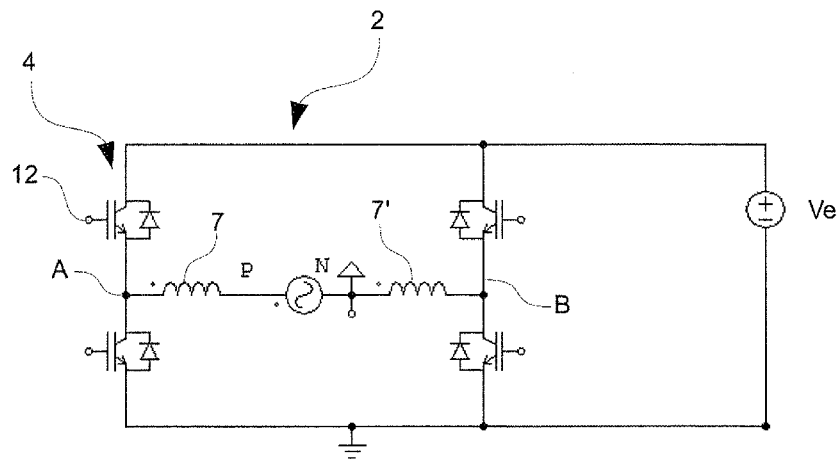
Figure 3:
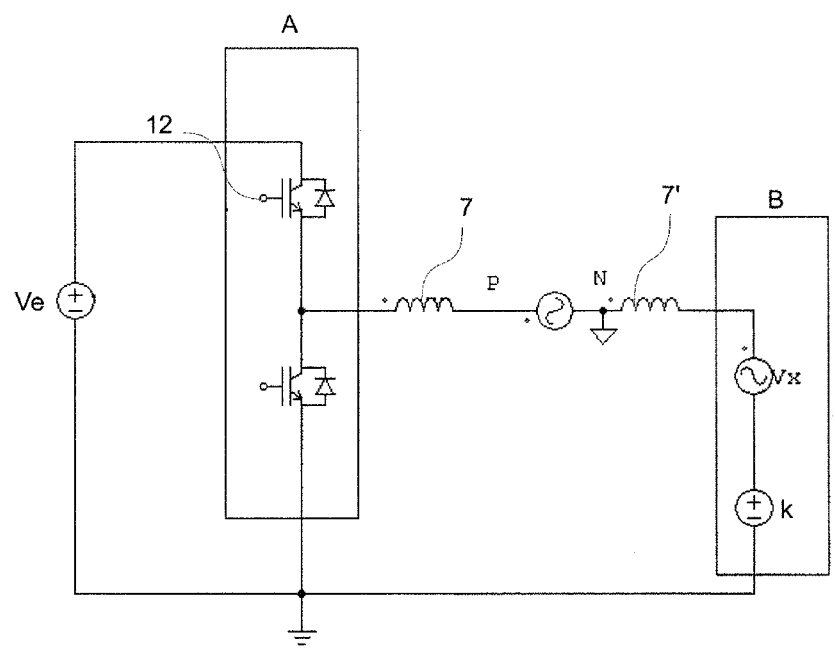
Figure 4:
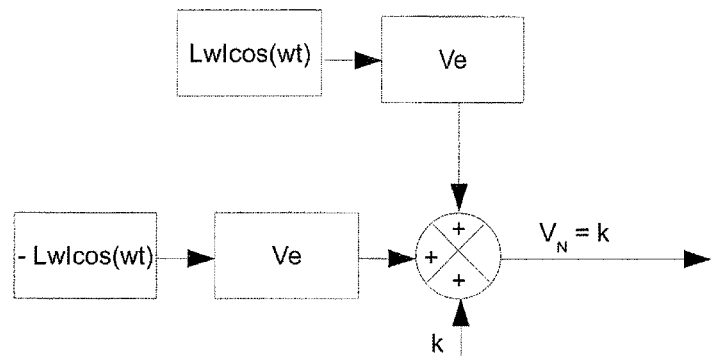
Figure 5:
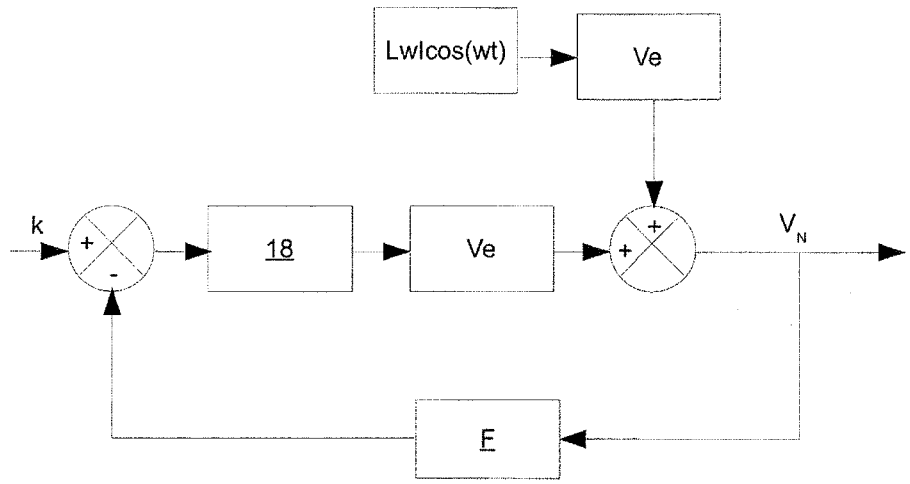
Figure 6:
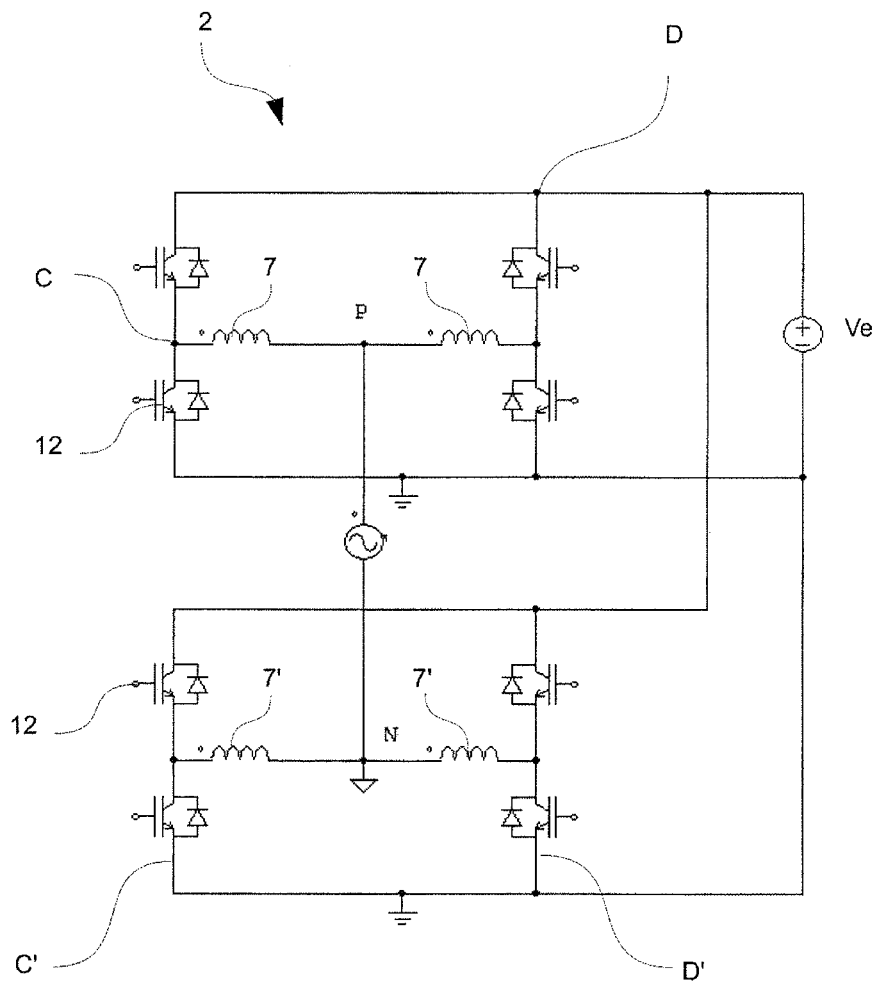

Other features and advantages of the invention will become apparent from the following description, given as a nonlimiting example, in light of the appended drawings in which:

FIG. 1a represents in a schematic and simplified manner a charging device according to a first variant embodiment, FIG. 1b represents in a schematic and simplified manner a charging device according to a second variant embodiment, FIG. 2 shows in more detail a part of the charging device of FIG. 1a or 1b, FIG. 3 illustrates a part of the device of FIG. 1a or 1b on which the second switching arm of the inverter of the device is represented by an average model, FIG. 4 is a diagram of the open loop for controlling the second switching arm of the device of FIG. 1a, FIG. 5 is a diagram of the slaving closed loop for controlling the second switching arm of the device of FIG. 1b, and FIG. 6 represents an inverter of the device of FIG. 1a or 1b with two intermingled H-configuration bridges.

In these figures and hereinafter in the description, the elements that are substantially the same are identified by the same reference numbers.

Referring to FIGS. 1a to 2, these show, represented in a schematic and simplified manner, a charging device 1 for a motor vehicle, for example of hybrid or electric type, according to an exemplary implementation of the invention.

This charging device 1 comprises, in the example concerned:
- an inverter 2 and switching means 4 incorporated in the inverter 2 comprising two switching arms A, B,
- accumulation means 5 forming a battery generating a direct voltage Ve,
- a single-phase alternating current engine 6, partially represented, whose winding 7 serves as inductance,
- an additional compensation inductance 7',
- connection means 8,
- a control circuit 9 for the switching means 4, and
- optionally, a DC/DC converter 10 positioned between the inverter 2 and the accumulation means 5.

The use of a DC/DC converter 10 makes it possible to adapt the voltages and consequently to optimize the dimensioning of the inverter without degrading efficiency. In practice, the voltage of the accumulation means 5 varies with their charges, the variations ranging from single to double, and the use of a DC/DC converter 10 makes it possible to dimension the inverter 2 for a lower voltage, the latter having to allow two times less current to pass.

The connection means 8 allow for the connection to the outlet of a single-phase electrical network 11. This connection means may comprise locking means, not represented in the appended figures, making it possible to prevent access to the electricity outlet if the device 1 is powered up. The connection means 8 may also be associated with second locking means (not represented) preventing the user from accessing the conductors (which are then live) during the power supply mode.

As can be seen in FIG. 2, the winding 7 of the engine 6 is linked to the phase P of the network 11. This winding 7 is linked to the mid-point of the first arm A and the second arm B is linked to the second compensation inductance 7' also linked to the neutral N of the network 11. The neutral N of the network 11 is also linked to ground.

In the example illustrated, the device 1 is designed to operate in two modes:
- a power supply mode in which it provides alternating current power supply for the engine 6, from the battery 5, and
- a charging mode in which it charges the battery 5 from the electrical network 11 linked to the earth, by employing the winding 7 of the engine 6 as inductance.

The switchover from the power supply mode to the charging mode can be managed by the control circuit 9.

The control circuit 9 controls the two switches 12 of each arm A and B. In power supply mode, the control circuit 9 controls the arms A and B so as to allow for the circulation of an alternating current in the phase of the engine 6. The switches 12, which in the present example are power transistors with an inverse-mounted diode, are controlled according to a conventional sinusoidal PWM control, PWM being the anagram for "Pulse Width Modulation" α.

On the other hand, in charging mode, the control of the two arms is independent so as to compensate for the low-frequency currents.

More specifically, the control circuit 9 controls the first arm A to absorb a sinusoidal current in order to produce the PFC (Power Factor Corrector) function.

The second arm B is controlled so as to generate an alternating voltage in phase opposition relative to the voltage at the terminals of the compensation inductance 7'.

In practice, referring to FIG. 3 in which the arm B is modelled by an average model, it can be seen that the voltage between the neutral N of the network 11 and ground is equal to the sum of the voltages at the terminals of the compensation inductance 7' and of the second arm B (relationship (1)).

$$V_N = Z_L \cdot I_{AC} + Vx + k \quad (1)$$

(in which $Z_L$=the impedance of the inductance 7', $I_{AC}$=the alternating current supplied by the network 11, $Vx$=the alternating voltage generated by the second arm, and k=the direct voltage generated by the second arm B).

Being sinusoidal, the voltage at the terminals of the compensation inductance 7' is expressed according to the relationship (2):

$$Z_L \cdot I_{AC} = LwI \cos(wt) \quad (2)$$

(in which L=the inductance, and w=the angular or pulsation speed) Thus, if the voltage Vx is opposite to the voltage LwI cos (wt) at the terminals of the compensation inductance 7', the voltage $V_N$ between the neutral N of the network 11 and ground is constant (relationship (3)).

$$V_N = LwI \cos(wt) - LwI \cos(wt) + k$$

$$V_n = k \quad (3)$$

For this, the control circuit 9 may control the second arm B in open loop mode (FIGS. 1*a* and 4). In this case, the value L of the compensation inductance 7' is accurately known, as is the value of the current I. There is then a stable system. The pulse width α is therefore chosen to be equal as an average value to the opposite of the voltage at the terminals of the compensation inductance 7', −LwI cos (wt).

During the charging method, the switches 12 of the second switching arm B are therefore controlled by pulse width modulation control signals α equal as an average value to the opposite of the voltage at the terminals of the inductance 7'.

According to an alternative, the control circuit 9 may control the second arm B in closed loop mode (FIGS. 1*b* and 5). In this case, the value of the voltage $V_N$ between the neutral N of the network and ground is slaved to the setpoint k without having to know the value L of the inductance 7' or the current I.

For this, the device 1 also comprises:
a means 14 for measuring the voltage between the neutral N and ground,
a comparator 16 for comparing the measured voltage to the setpoint k, and
a corrector 18 for adjusting the pulse width α of the PWM control signals when the voltage between the neutral N and ground varies.

Since the voltage $V_N$ is switched, a filter F is necessary on the return subsystem for the acquisition of the voltage.

Thus, during the charging method, the switches 12 of the second switching arm B are controlled by control signals whose pulse width is constantly adapted so that the voltage $V_N$ between the neutral N of the network and ground is slaved to the setpoint k.

To this end, the voltage $V_N$ is measured, it is compared to the setpoint k and when the voltage $V_N$ varies, the pulse width α is corrected accordingly.

The voltage $V_N$ is therefore constant which makes it possible to limit the low-frequency disturbances.

In addition, in order to also limit the high-frequency disturbances, it is possible to provide, in series with the compensation inductance 7', a capacitor and a resistor forming a low-pass filter.

Moreover, an inverter has been described here with 2 switching arms A and B. It is possible to provide, according to a variant illustrated in FIG. 6, an inverter with two intermingled H-configuration bridges. The first H-configuration bridge is formed by two switching arms C and C' and the second H-configuration bridge is formed by two switching arms D and D'.

The operation is similar compared to the examples detailed previously. In practice, in this case, one of the arms, for example the fourth arm D', will be controlled in a manner similar to the second arm B as described above. Also, the other arms C, C' and D provide the power factor control PFC function like the first arm A in the preceding examples.

Thus, with this charging method, suitable in particular for charging a battery powering an engine 6 in a hybrid or electric vehicle, it is possible, in a simple way, to eliminate the low-frequency disturbances by maintaining a constant voltage $V_N$ between the neutral N of the network 11 and ground.

The invention is not limited to the above-described exemplary embodiments.

In particular, the engine may be other than a single phase current engine. The engine may operate with a single phase network or a network with a different phase number.

The invention is not restricted to charging accumulation means but broadly relates a system connected to an electrical network, said system having at least a first and a second switching arm, each of which comprises two switches and deals with controlling the switches so that the voltage between the neutral of the network and the ground is a direct voltage, regardless whether the system is part of a charging device of accumulation means.

In all cases, the switches may optionally be part of an inverter and the inductance may optionally define a phase of an engine.

The invention claimed is:

1. A method for controlling switches of a system connected to an external electrical network, the system comprising at least a first and a second switching arm respectively comprising two switches, said method comprising:
    controlling the switches of the switching arms by transmission of pulse width modulation control signals,
    wherein the switches of the second switching arm are controlled by adapting a pulse width of the control signals to generate an alternating voltage in phase opposition relative to a voltage at the terminals of a compensation inductance connected to the second arm and to a neutral of said network, so that a voltage between the neutral of said network and ground is a direct voltage.

2. A method for charging accumulation means via an external electrical network via at least a first and a second switching arm respectively comprising two switches, said method comprising:
    controlling the switches of the switching arms by transmission of pulse width modulation control signals,
    wherein the switches are controlled by adapting a pulse width of the control signals to generate an alternating voltage in phase opposition relative to a voltage at the terminals of a compensation inductance connected to the second arm and to a neutral of said network, so that a voltage between the neutral of said network and ground is a direct voltage.

3. The method according to claim 1, the second switching arm being controlled in open loop mode and the pulse width being chosen to be substantially equal as an average value to the opposite of the alternating voltage of the compensation inductance.

4. The method according to claim 1, the second switching arm being controlled in closed loop mode by varying the pulse width so that the voltage between the neutral of said network and ground is slaved to a setpoint.

5. The method according to claim 4, further comprising:
    measuring the voltage between the neutral of said network and ground;
    comparing the measured voltage to the setpoint; and
    when the measured voltage differs from the setpoint, modifying the pulse width so that the voltage between the neutral of said network and ground is substantially equal to the setpoint.

6. The method according to claim 1, the first arm being controlled to absorb a sinusoidal current.

7. An electrical device for charging accumulation means via an external electrical network, said accumulation means being configured to power an engine with alternating current, said electrical device comprising:

an inverter connected between said engine and the accumulation means, the inverter having at least a first and a second switching arm respectively comprising two switches, said switching arms being linked by their mid-points to the phase of said engine;

a control circuit for controlling said switches by transmission of pulse width modulation control signals; and a compensation inductance linked to the second switching arm and to the neutral of said network, wherein the control circuit is configured to control the switches of the second arm by transmission of control signals whose pulse width is adapted so that the second arm generates an alternating voltage in phase opposition relative to the voltage at the terminals of the compensation inductance, so that the voltage between the neutral of said network and ground is a direct voltage.

8. The electrical device according to claim 7, wherein the device is a single-phase device.

9. The electrical device according to claim 7, wherein the device is configured to control the second switching arm in open loop mode.

10. The electrical device according to claim 7, wherein the device is configured to control the second arm in closed loop mode by slaving the voltage of the neutral to a setpoint, and including at least a processing means for:

measuring the voltage between the neutral of said network and ground, comparing the measured voltage to the setpoint, and when the measured voltage differs from the setpoint, correcting the value of the pulse width so that the voltage of the neutral is substantially equal to the setpoint.

11. The electrical device according to claim 8, further comprising a capacitor and a resistor mounted in series with the compensation inductance to form a low-pass filter.

12. The electrical device according to claim 8, the inverter having two H-configuration bridge structures respectively produced by two switching arms.

13. The electrical device according to claim 8, the control circuit being configured to control the switches so as to switch from a power supply mode for said engine to a charging mode for the accumulation means and vice versa.

14. The electrical device according to claim 8, the first switching arm comprising a mid-point linked to a first terminal of a phase of the engine, the second switching arm comprising a mid-point linked to a first terminal of the compensation inductance, and the second terminal of the compensation inductance being linked to the neutral of the network while the second terminal of the phase of the engine is linked to a phase of the network.

* * * * *